United States Patent
Dennis et al.

(10) Patent No.: US 11,483,214 B2
(45) Date of Patent: *Oct. 25, 2022

(54) SYNCHRONIZING DATA BETWEEN CLOUD MANAGER AND PROVIDERS

(71) Applicant: Skykick, Inc., Seattle, WA (US)

(72) Inventors: John Dennis, Oakland, CA (US); Corey Brent Caldwell, Covington, KY (US); Douglas Handler, Seattle, WA (US); Evan Richman, Seattle, WA (US); Todd Schwartz, Seattle, WA (US); Bradley Younge, Denver, CO (US); Matthew Steven Hintzke, Redmond, WA (US)

(73) Assignee: SkyKick, Inc., Seattle, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/787,010

(22) Filed: Feb. 10, 2020

(65) Prior Publication Data

US 2020/0177472 A1    Jun. 4, 2020

Related U.S. Application Data

(63) Continuation of application No. 15/199,932, filed on Jun. 30, 2016, now Pat. No. 10,560,342.

(Continued)

(51) Int. Cl.
*H04L 41/22*    (2022.01)
*G06F 16/23*    (2019.01)
(Continued)

(52) U.S. Cl.
CPC .......... *H04L 41/22* (2013.01); *G06F 16/2365* (2019.01); *H04L 41/0803* (2013.01);
(Continued)

(58) Field of Classification Search
CPC ..... H04L 41/22; H04L 67/02; H04L 41/0803; H04L 67/1097; H04L 67/16; H04L 67/306; G06F 16/2365
See application file for complete search history.

(56) References Cited

U.S. PATENT DOCUMENTS 8,694,686 B2    4/2014 Roth et al.
8,812,687 B2    8/2014 Kandhare et al.
(Continued)

OTHER PUBLICATIONS

U.S. Appl. No. 15/199,932 , "Final Office Action", dated Mar. 5, 2019, 18 pages.
(Continued)

*Primary Examiner* — Huawen A Peng
(74) *Attorney, Agent, or Firm* — Kilpatrick Townsend & Stockton LLP

(57) ABSTRACT

System and method are disclosed for enabling data synchronization with different cloud service providers. Semantics of provide data from the cloud service providers may be determined and captured in a data object—i.e. a provider data object. The provider data object may then be instantiated for individual cloud service providers for synchronizing data with a given cloud service provider. Provider data can be received from the given cloud service provider can be processed using the instance of the provider data object. Specific provider information can then be extracted from the received provider data according the semantics defined in the instance of the provider data object. The extracted provider information can then compared with provider information already stored in a database. When one or more differences are detected between the two, the received provider information can be saved to the database.

20 Claims, 15 Drawing Sheets

Related U.S. Application Data

(60) Provisional application No. 62/187,124, filed on Jun. 30, 2015.

(51) Int. Cl.
  *H04L 67/51* (2022.01)
  *H04L 67/02* (2022.01)
  *H04L 67/306* (2022.01)
  *H04L 41/0803* (2022.01)
  *H04L 67/1097* (2022.01)

(52) U.S. Cl.
  CPC .......... *H04L 67/02* (2013.01); *H04L 67/1097* (2013.01); *H04L 67/306* (2013.01); *H04L 67/51* (2022.05)

(56) References Cited

U.S. PATENT DOCUMENTS

| | | | |
|---|---|---|---|
| 8,856,739 | B2 | 10/2014 | Jang |
| 9,071,606 | B2 | 6/2015 | Braun et al. |
| 9,143,400 | B1* | 9/2015 | Roskind .................. H04L 41/08 |
| 9,176,994 | B2 | 11/2015 | Chitiveli |
| 9,276,942 | B2 | 3/2016 | Srinivasan et al. |
| 10,560,342 | B2 | 2/2020 | Dennis et al. |
| 2010/0332401 | A1* | 12/2010 | Prahlad ............... H04L 63/0428 705/80 |
| 2011/0047480 | A1 | 2/2011 | Venkataraman et al. |
| 2011/0131275 | A1* | 6/2011 | Maida-Smith ........ H04L 63/168 709/204 |
| 2012/0059917 | A1 | 3/2012 | Dawson et al. |
| 2013/0013767 | A1 | 1/2013 | Stober et al. |
| 2013/0086549 | A1* | 4/2013 | Riehl .................. G06F 9/45516 717/146 |
| 2014/0075565 | A1 | 3/2014 | Srinivasan et al. |
| 2014/0165150 | A1* | 6/2014 | Brunswig ............... G06F 21/41 726/4 |
| 2014/0278808 | A1 | 9/2014 | Iyoob et al. |
| 2014/0280932 | A1* | 9/2014 | Braun .................... H04L 63/10 709/225 |
| 2015/0046971 | A1 | 2/2015 | Kim et al. |
| 2015/0074279 | A1 | 3/2015 | Murray et al. |
| 2015/0142602 | A1 | 5/2015 | Williams et al. |
| 2015/0381615 | A1 | 12/2015 | Schlesinger et al. |
| 2017/0004197 | A1 | 1/2017 | Dennis et al. |

OTHER PUBLICATIONS

U.S. Appl. No. 15/199,932, "Non-Final Office Action", dated Aug. 6, 2018, 18 pages.
U.S. Appl. No. 15/199,932, "Notice of Allowance", dated Sep. 26, 2019, 9 pages.

* cited by examiner

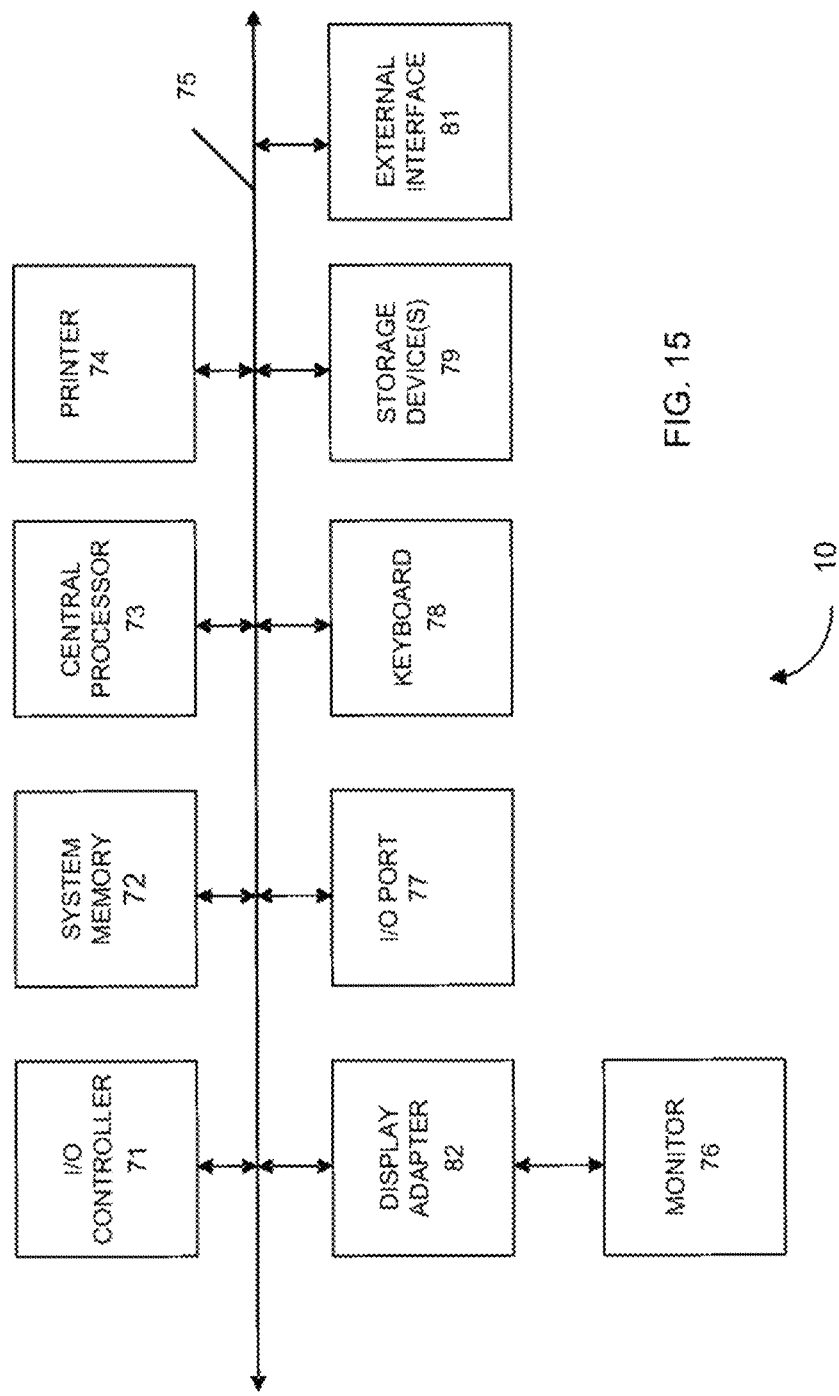

SYNCHRONIZING DATA BETWEEN CLOUD MANAGER AND PROVIDERS

CROSS-REFERENCES TO RELATED APPLICATIONS

This application is a continuation of U.S. patent application Ser. No. 15/199,932, filed on Jun. 30, 2016, entitled "SYNCHRONIZING DATA BETWEEN CLOUD MANAGER AND PROVIDERS", which claims benefit to U.S. Provisional Application No. 62/187,124, filed on Jun. 30, 2015, entitled "SYNCHRONIZING DATA BETWEEN CLOUD MANAGER AND PROVIDERS". Each of the aforementioned disclosures are incorporated by reference herein in their entirety for all purposes.

This application is related to U.S. Provisional Application No. 62/187,109 filed on Jun. 30, 2015, entitled "MANAGING USERS OF CLOUD SERVICES WITH MANAGEMENT TOOL" and U.S. Provisional Application No. 62/187,118 filed on Jun. 30, 2015, entitled "USE AND CONFIGURATION OF TEMPLATES FOR MANAGEMENT OF CLOUD PROVIDERS", each of which are incorporated by reference herein in their entirety for all purposes.

This application is related to U.S. Non-Provisional Application Ser. No. 15/199,872, filed Jun. 30, 2016 entitled "MANAGING USERS OF CLOUD SERVICES WITH MANAGEMENT TOOL" and U.S. Non-Provisional application Ser. No. 15/199,930, filed Jun. 30, 2016, entitled "USE AND CONFIGURATION OF TEMPLATES FOR MANAGEMENT OF CLOUD PROVIDERS" each of which are incorporated by reference herein in their entirety for all purposes.

FIELD

The disclosure generally relates to management of data within software as service products. Specifically, the disclosure relates to enhanced management of various software as a service providers and attributes and synchronization of data.

BACKGROUND

Modern companies and associated IT consulting firms need to manage the software services that the companies provide to employees or other authorized individuals. This process can involve the provision of a variety of computer services from a variety of vendors to employees of the company or other authorized individuals. IT consulting firms can be hired by companies to manage the IT environment for a company. The services can often have various differing user interfaces and data formats, which can require a high level of overhead to manage. Different employees or individuals can need various access rights to different software services, and those access rights can vary based on for example an employee's or individual's role. For example certain employees should be provided different access to software services such as Office 365, Salesforce, Dropbox, Box, AutoCAD, Google Apps, Facebook, etc. However, the process of managing the data related to these services and maintaining and updating data can be a challenging process. When data changes are made at a provider, or changes are desired to be made at the provider, then maintaining synchronized up to date data can be challenging.

Embodiments of the invention address these and other problems, individually and collectively.

BRIEF SUMMARY

Embodiments can enable data synchronization with different cloud service providers. Semantics for certain provider information of interest to an entity, such as a company, can be predefined and captured in a provider data object. The predefined semantics in the provider data object can be seen as defining "standard" provider information of interest to the entity. During a synchronization process with any service provider used by the entity, an instance of the provider data object can be generated. The instance of the provider data object can be used to process provider data received from the cloud service provider. Specific provider information regarding the cloud service provider can then be extracted from the provider data received from the cloud service provider according to the predefined semantics in the instance of the provider data object. The extracted provider information can then be compared with provider information already stored in the database. When one or more differences between the two are detected, the provider information received from the cloud service provider can then be saved to the database. Since the semantics of the provider data to be processed has already been predefined, this can help the entity synchronize data with a new service provider without having to develop a synchronization process with the new service provider from scratch.

In certain embodiments, the synchronization process in accordance with the disclosure may employ a customer provider data object. The customer provider data object can have semantics similar to those in the provider data object described above. One or more instances of the customer provider data object can be created from provider information already stored in the database. In those embodiments, the instance(s) of the customer provider data object can be compared with corresponding instance(s) of the provider data object during the synchronization process. For example, certain fields in the corresponding instance(s) of the provider data object may link the instance(s) of the customer provider data object. Through these links, the instance(s) of the customer provider data object can be compared with corresponding instance(s) of the provider data object.

A better understanding of the nature and advantages of embodiments of the present invention may be gained with reference to the following detailed description and the accompanying drawings.

BRIEF DESCRIPTION OF THE DRAWINGS

FIG. 15 illustrates a computer system that can be used to implement various embodiments in accordance with the disclosure.

DETAILED DESCRIPTION

Figure 1:
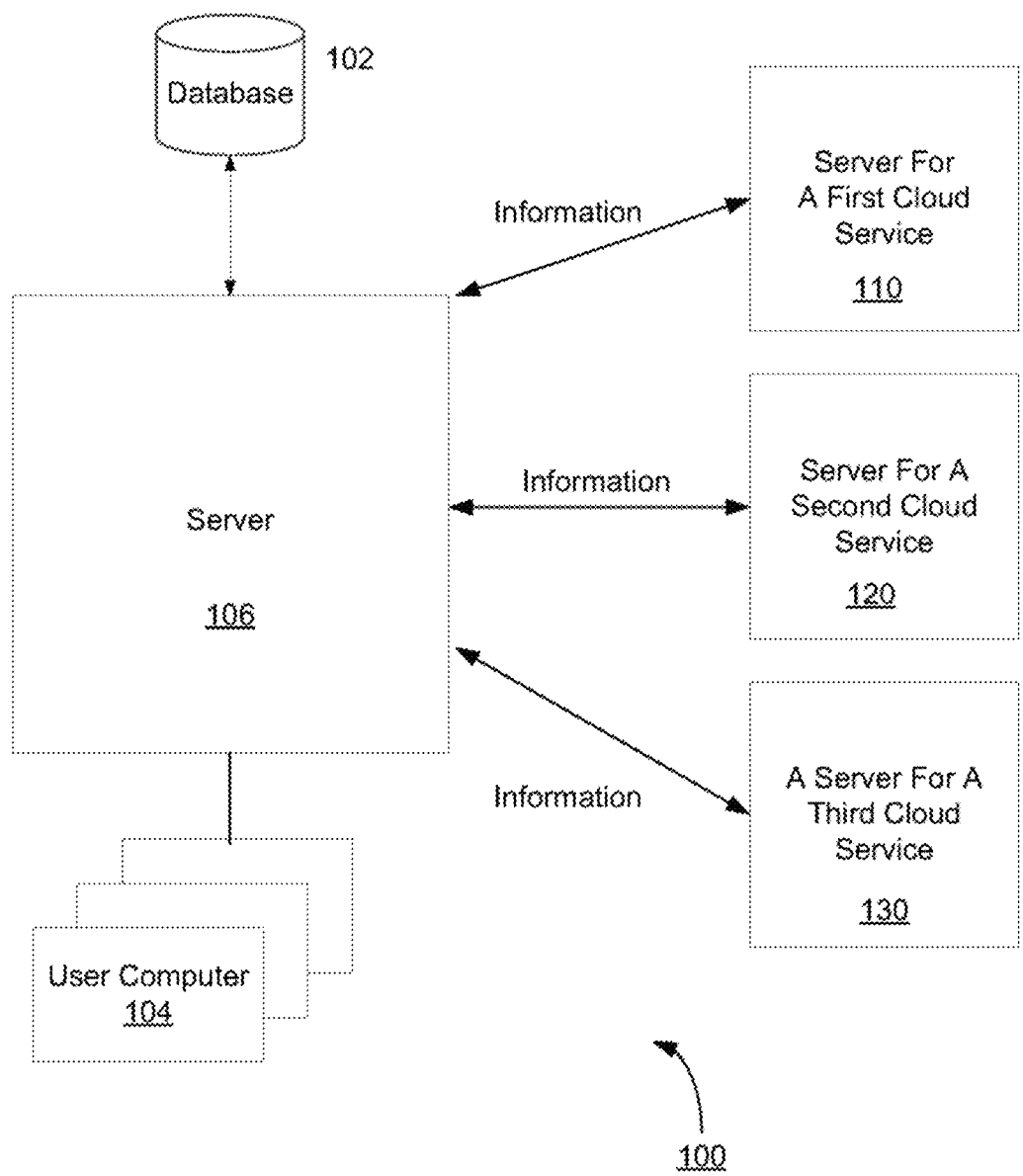
FIG. 1 illustrates an exemplary system architecture for managing individual users within an entity to use multiple cloud services in accordance with the disclosure.

Embodiments can enable data synchronization with different cloud service providers. Semantics of provider data from the cloud service providers may be determined and captured in a data object—i.e. a provider data object as referenced herein. The provider data object may then be instantiated for individual cloud service providers for synchronizing provider data with the cloud service providers. For example, license data from the cloud service providers may be abstracted to obtain license data semantics across the cloud service providers. In some embodiments, for example, the license data semantics may include a field representing one or more particular licenses provided by a given cloud service provider. The provider data object containing the license data semantics can then be instantiated for a given cloud service provider for synchronizing provider data with the given cloud service provider. The instance of the data object can be used to extract various provider information from provider data received from the given cloud service provider including the license data information.

In implementations, the provider data received from the given cloud service provider may be processed to obtain the license data information as described by the license data semantics in the license data object. Provider data as obtained by the instance of the provider data object can then be compared with existing data stored in a database of an entity, such as a company. If one or more differences between the two are detected based on the comparison, the received provider data can then be saved to the database to update the corresponding data in the database. In this way, synchronization with a given cloud service provider can be conveniently achieved since the semantics of the provider information to be synchronized are pre-defined.

Other examples of provider data semantics that can be captured in the provider data object may include provider specific settings, provider specified user settings, authentication settings, and/or any other provider data semantics. In various embodiments, provider data from the given cloud service provider can also be processed using those semantics.

In certain embodiments, a customer provider data object may also be employed during the synchronization process with the cloud service provider. In those embodiments, the customer provider data object may have the same as or substantially similar data semantics as the provider data object. Instances of the customer provider data object can be generated for different cloud service providers subscribed to by the entity. For example, an instance of the customer provider data object can be generated for a given cloud service provider. The instance of the customer provider data object can then be used to extract existing provider information stored in a database of the entity. Since the customer service provider data project have the same or substantially similar data semantics to a corresponding instance of the provider data object for the given service provider, the two can be compared during a synchronization process.

I. System Architecture

FIG. 1 illustrates an exemplary system architecture 100 for managing individual users within an entity to use multiple cloud services in accordance with the disclosure. As shown, the system architecture 100 may include a server 106 provided by the entity. The server 106 may be configured to facilitate user management for different cloud services subscribed to by the entity, to enable the users to use the cloud services via the individual client computers 104, and/or to perform any other functions. In certain implementations, the server 106 may include one or more processors configured to perform web services, processing jobs and/or to perform any other functions. As shown, the server 106 may be operatively coupled to a database 102, which can contain user profiles associated with the individual users of the entity. A user profile associated with a particular user of the entity may comprise information indicating specific cloud services provided by the user. For each of the specific cloud services, one or more features or settings that are available for the individual users, values (default or configured) for those features or settings for the particular user, and/or any other information can be indicated through the user profile. As will be described below, the user profile associated with the particular user can be used to facilitate the particular user to use the cloud services available to the particular user as subscribed to by the entity.

In some embodiments, server 106 can be configured to provide virtualization of groups or teams of employees within the entity, and the ability to apply various actions across cloud services to groups or teams of users. For example, different groups or teams within the entity include sales, marketing, engineering, or the like.

The server 106 can be configured to communicate with cloud servers, such as cloud servers 110, 120, 130 shown in this example. As shown, each of the cloud servers 110, 120, 130 may be provided by a cloud service provider for facilitating respective cloud-based services. For example, the cloud server 110 may be a server that facilitates a cloud-based email service. The cloud server 120 may be a server that facilitates a network storage service. The cloud server 130 may be a server that facilitates a cloud-based backup service. As also shown, the server 106 may be configured to communicate with each of the cloud servers 110, 120, 130.

The communication between the server 106 and a given cloud server may include communication of various information including license, provider specific settings, provider specified user settings, authentication information, and/or any other cloud service information. The license information f may include information indicating one or more types of licenses provided by the given cloud service provider, a number of licenses available for the entity for each type, various license features for each type, and/or any other license information. The provider specific setting information may include information indicating a name of the provider, one or more types of network connections supported by provider, one or more network addresses associated with provider, one or more domain names associated with the provider, and/or any other provider specific settings. The provider specified user settings information may include information indicating various service features that can be accessed by a given user, a maximum length for a user name, one or more requirements for a valid user password, one or more groups that can be joined by the given user, and/or any other provider specified user settings. The authentication information may include information indicating one or more security mechanisms available for authenticating a given user from the entity to use the given cloud service. For instance, the authentication information may indicate that a given service provider can authenticate a user through SSL, OAuth, secured HTTP, and/or any other security mechanisms.

For enabling the respective cloud service for the users within the entity, sever 106 may store user information for those users. For example, as mentioned above, the server 106 may store a set of user information regarding cloud email service for the users in the entity, and another set of user information regarding network storage service for the users in the entity. The server 106 may also store provider information.

II. A Method Of Synchronizing The Provider Data

The data from various cloud service providers and related settings can be stored by the server 106 within the database 102. As mentioned above, the database 102 can be configured to store provider data at the provider level, such as license, provider specific settings, provider specified user settings, authentication mechanisms supported and/or any other provider data. At the provider level, for example, password policies such as reset interval, and also user level settings, for example user roles and access levels for different systems by the provider can be stored as provider data. Various providers can provide authenticated web services that comply with authentication standards or formats like OAuth, OpenID, Persona, SAML, or similar. These standards can specify a process for resource owners to authorize third-party access to their server resources without sharing their credentials. The authentication mechanism may utilize an implementation of one of these standards or formats, a similar authentication standard or format, or it may store an administrative credential with authorized access to the third-party. As also mentioned above, the database 102 can also be configured to store user records for individual users within the entity.

A. Storing The Provider Data

Figure 2:
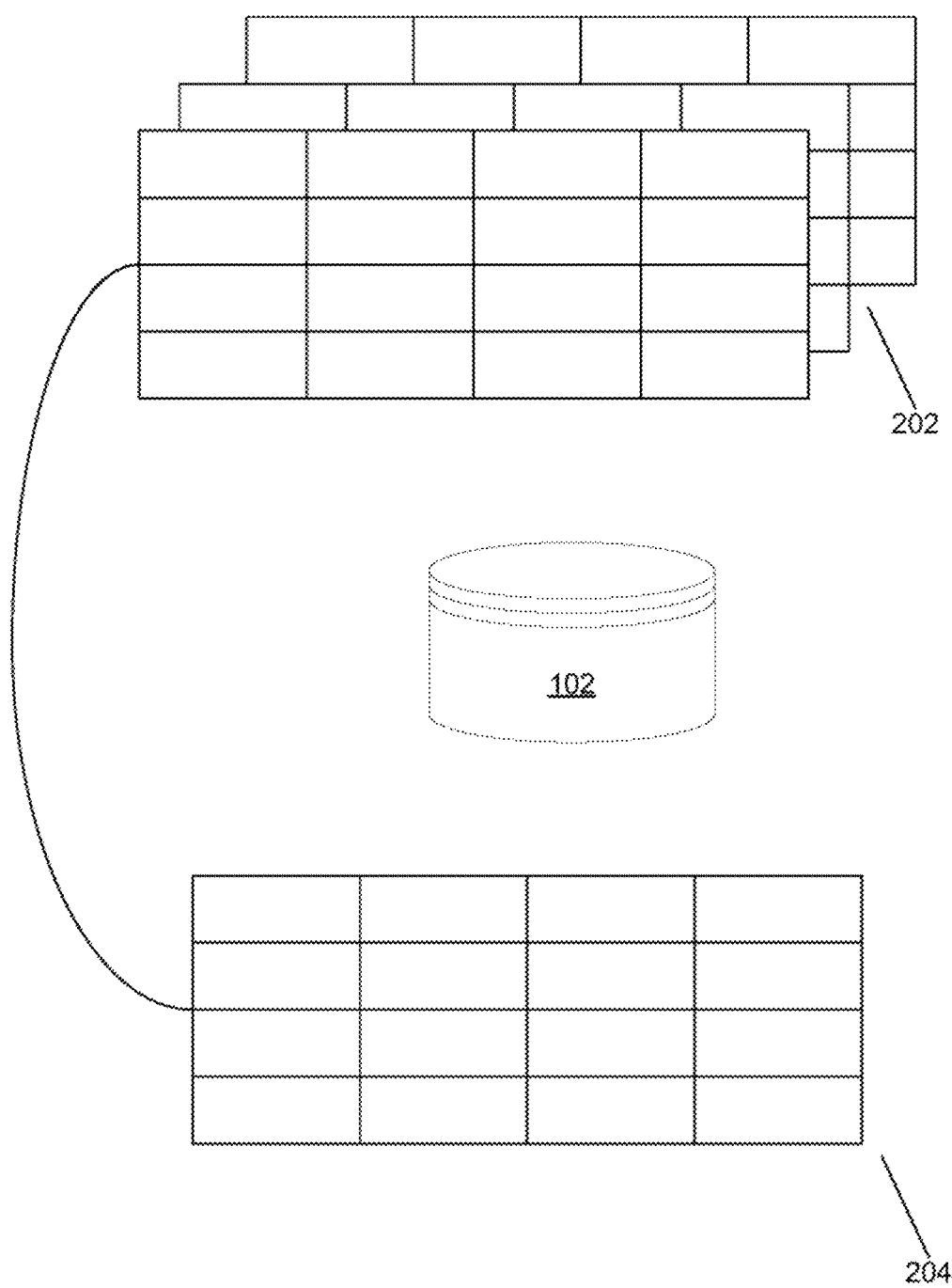
FIG. 2 illustrates one example of storing the provider data and the user records in a database of the entity.

FIG. 2 illustrates one example of storing the provider data and the user records in a database of the entity. As shown, in this example, the individual user records are stored in one or more of a user table 202. As also shown, the provider data is stored in a table 204 separate from the user table 202. For example, when an entity signs up for a service from a provider, settings for the entity for the particular provider and store those settings in the database 102. In certain embodiments, the database 102 can store information based on how many licenses for a cloud service that an entity has purchased. There can be a record in the database for each and every license so if the entity purchased 32 licenses for a provider, there can be 32 records in the database with information stored based on the information provided by the cloud service provider. That is, the database 102 can store licenses as individual records, a one-to-one relationship. If there are 13 licenses, then there can be 13 database records and each one of those licenses can be optionally assigned to one user, one or none, based on the assigned ID of the license. Accordingly, one license can correspond to one user. In the provider data, there may be information indicating a type of license and a numerical value indicating a quantity of this type of license is granted to the entity by the cloud service provider. The database 102 can store user-affiliated license information in the user record. In some embodiments, the database can also store license objects.

For groups, some providers may support them and others may not. The database 102 can store a name for a group and then the user IDs that are associated with that group. The user settings can correspond to the user on a particular provider. There are also provider level settings that can be supported. Those settings do not necessarily correspond to a license. In a particular provider, there can be a user that has no licenses but is still an administrator in the system.

Figure 3:
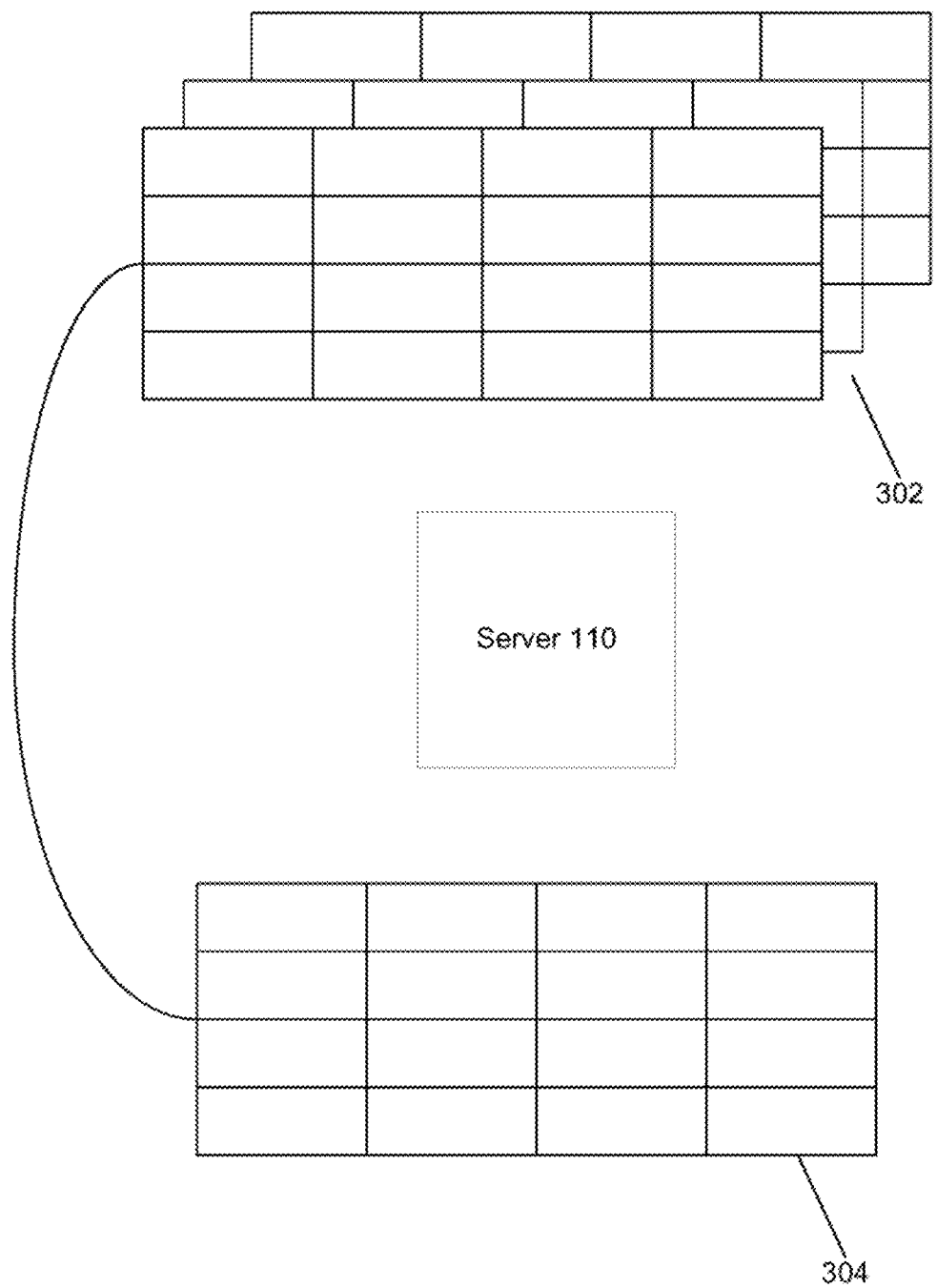
FIG. 3 illustrates one example of storing the provider data and the user records by a cloud server.

On the cloud provider side, the user data and provider data may be similarly stored by a given cloud server, such as server 110. FIG. 3 illustrates one example of storing the provider data and the user records by a cloud server. As shown, the given cloud server, such as cloud server 110 in this example, can be configured to store the user records on the cloud service provided by the given cloud service provider through one or more of a user table 302, and store information related to the given cloud service provider in a provider data table 304.

B. Provider Data Discovery

When a cloud service is first added or created by an entity, a discovery process can be initiated to obtain the provider data of interest to the entity and store the provider data in a database associated with the entity, such as the database 102. For example, the discovery process can discover what licenses and features provided by the cloud service provider, the users in the entity that already granted licenses to use the cloud service, one or more groups provided by the cloud service, one or more users in the entity that are in each of those groups, one or more authentication mechanisms supported by the cloud service provider, and/or any other provider data. During discovery process, provider information may be discovered from a given cloud server, such as server 110, and stored in database 102 as shown in FIG. 2.

After the initial discovery process, a synchronization process can happen at any times during a life cycle of cloud service to bring the provider data stored in the database up to date with the cloud service provider. For example, the synchronization process can happen on a daily basis, nightly basis, weekly basis, or any other bases. The synchronization process can establish a connection with the cloud service provider and obtain provider data from the cloud service provider. The provider data can include can include groups, licenses, specific provider settings, user settings and/or any other provider data. In certain situations, a given cloud service may not necessarily have a mechanism to inform an entity that certain provider information has been changed since the entity last obtained the provider information. To be sure that the data that in the tool is correct and the most up to date on the entity side, the provider data obtained from a provider may be compare to with what is already stored by the entity.

C. Synchronizing The Provider Data

Each individual cloud service can have its own individualized data format or method of providing the data requested by an entity. Some might return in a particular object format, another in an XML format, and so on. The data might contain certain tags or other identifiers specifying the type of data or other details concerning the data. One cloud service might use basic authentication with username and password to get logged in, while others can use OAuth or a similar authentication mechanism. Once logged into a cloud service, the entity may user commands via Microsoft Powershell, HTTP-based REST APIs, or another API protocol to request and retrieve objects. Some providers support things that others providers do not. For example, a provider could decide not to support groups, and as a result they just will not return any groups data back. Each provider can return a different object back containing all the pertinent provider data. Such wide range of provider data in various formats presents a challenge to an entity when synchronizing data with the cloud service providers the entity uses. Conventionally, separate synchronization process with each of the cloud service providers is typically developed by the entity.

As the entity may add or delete cloud services as desired, synchronizing new provider data after the discovery could become tedious. That is because code needs to be developed for each new provider to synchronize data from the new provider. However, this development process can be expensive. To address this challenge, the inventors have come up with an idea to pre-define semantics of provider data in advance of the synchronization. The pre-defined semantics of the provider data can then be captured in a provider data object on the entity side. The provider data object can be used for synchronizing with any cloud service provider. Thus, the predefined semantics in the provider data object can be seen as defining "standard" provider information of interest to the entity.

During synchronization with a given cloud service provider, an instance of the provider data object can then be created for the given cloud service provider and stored in memory of server 106. The instance of the provider data object can be used to process information from the given cloud service provider for extracting various provider information in accordance with the pre-defined semantics. The extracted provider information can then be compared with existing data for the given cloud service provider in the database 102. If it is determined that there are one or more differences between the two, the provider information from the cloud service provider can be saved to the database to achieve synchronization. While some codes may still need to be developed for each new provider for processing the provider data, such as code for parsing the provider data from the given cloud service provider, such code may be fairly easily developed since the semantics of the provider data to be processed has already been defined. Therefore, this can help an entity easily synchronize data with a new service provider without having to develop a synchronizing process with the new service provider from scratch.

Figure 4:
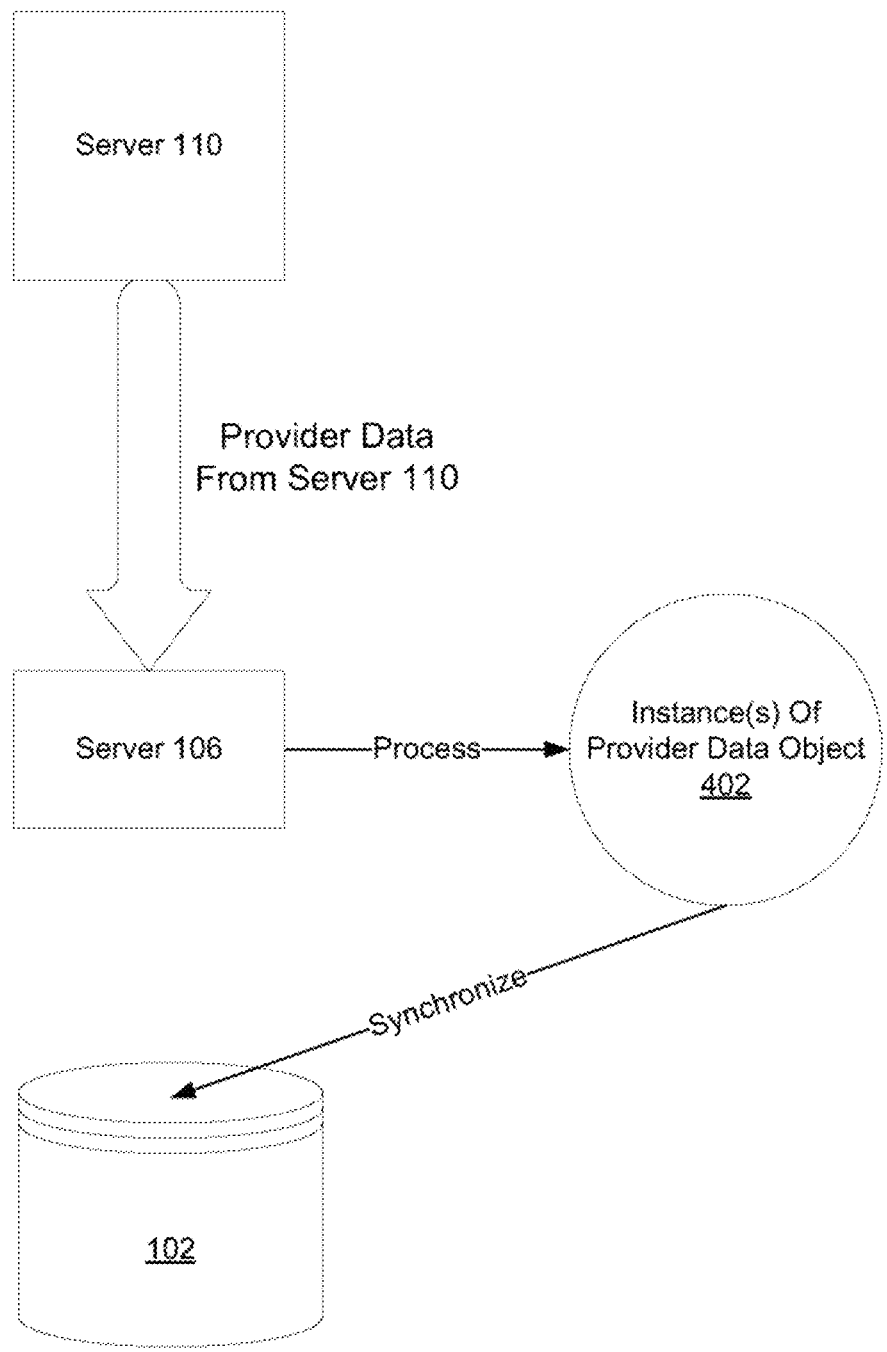
FIG. 4 illustrates conceptually synchronizing provider data in accordance with the disclosure.

FIG. 4 illustrates conceptually synchronizing provider data in accordance with the disclosure. As shown, the server 106 can be configured to obtain provider data from server 110 and create one or more instances of the provider data object. After receiving the provider data from the server 110, the server 106 can be configured to process the received provider data using the one or more instances of provider data object 402. The processing may include parsing the received provider data and extract provider information from the received provider data in accordance with the semantics defined in the provider data object. This could involve making searches into the received provider data to extract specific provider information as defined by the semantics of the provider data object, for example specific license information, provider settings information, provider specified user settings information, authentication mechanisms supported, and/or any other provider information. The instance(s) of the provider data object 402 can then be compared with the existing provider data (i.e., received from server 110 previously) stored in the database 102 If there is a difference between the two, the provider information as obtained through the instance(s) data object can then be saved to the database 102 to update the database 102.

III. Provider Data Object

As described above, for synchronizing with any given cloud service provider, a provider data object can be created to capture semantics of certain provider information of interest to an entity. The semantics may define particular provider information that is to be synchronized with the cloud service provider. The provider data object can then be instantiated for a given cloud service provider during data synchronization with that cloud service provider. As described above, the instance(s) of the provider data object can be used to process the provider data obtained from the given cloud service provider, and to extract particular provider information of interest to the entity. In some implementations, the provider data object can be modeled using an object-oriented paradigm. For example, a class of provider data can be defined such that certain general provider attributes or fields are predefined through the provider class. In certain implementations, the attributes in the provider class can be linked to corresponding classes, and so on. Below are descriptions of some exemplary classes that can be defined for the provider data object.

A. Provider Class

Figure 5:
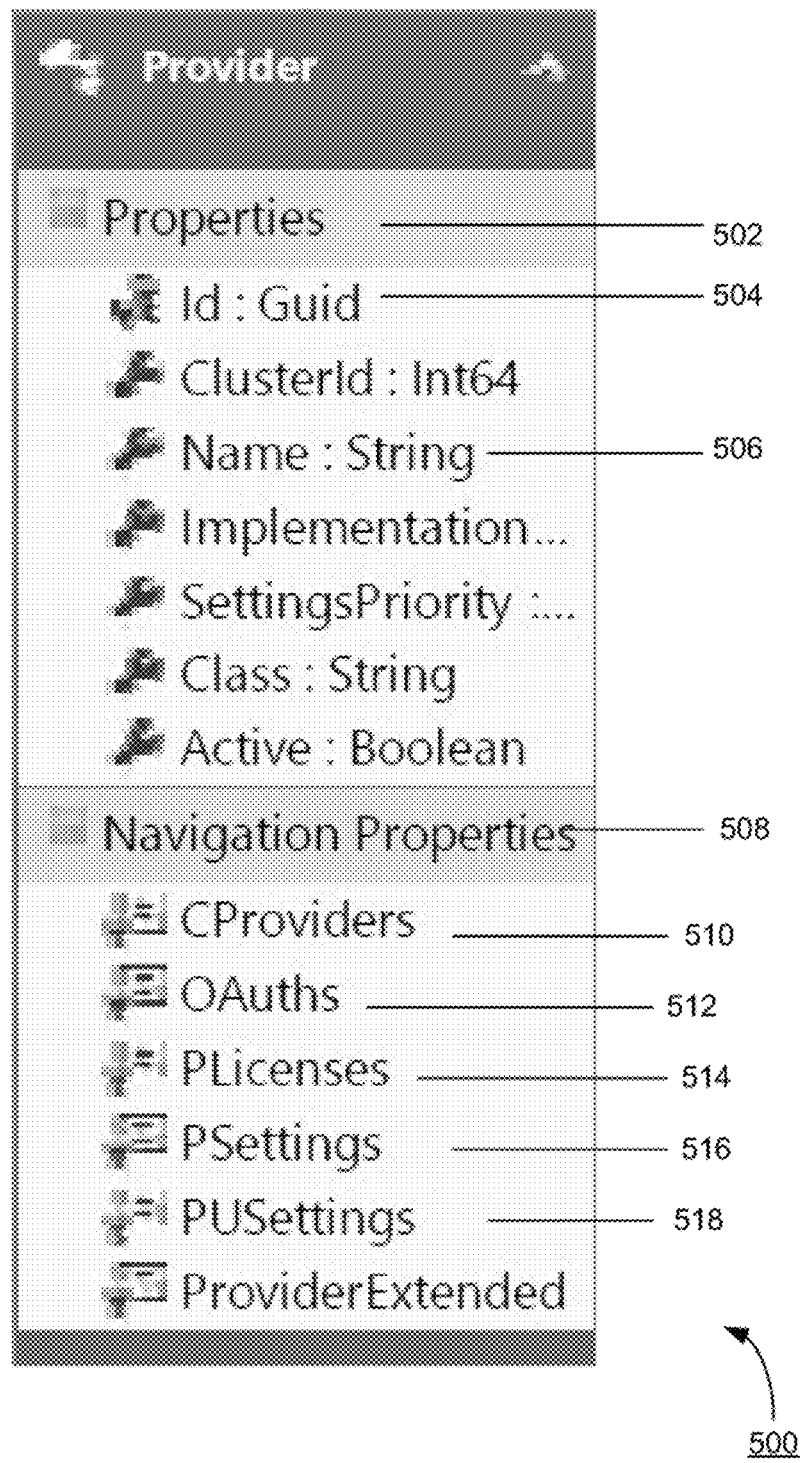
FIG. 5 illustrates an example a provider class that can be implemented for the provider data object.

FIG. 5 illustrates an example a provider class 500 that can be implemented for the provider data object. As can be seen, the provider class 500 may have group of properties 502 with respect to some specific attributes associated with the provider, such as an ID field 504 indicating a provider ID associated with the cloud service provider, a name field 506 indicating a name of the cloud service provider. After the provider data object is instantiated, these fields can be used to process the provider data from a given cloud service and to obtain an ID of the cloud service provider or to obtain a name of the cloud service provider.

As also shown, the provider class 500 may also have a group of navigation properties 508. These properties or attributes may link other classes to the provider class 500. In this sense, the provider class 500 may be considered as a container class or a root class. From the provider class, classes linked by the navigation properties can be mapped. Some examples of the navigation properties 508 are shown in FIG. 5 merely for illustration and thus not intended to be limiting.

As shown, a CProvider 510 field can be defined in the provider class 500. As will be described, the CProvider 510 field can be used to link an instance of a customer provider data object to an instance of the provider data object. As also shown, an OAuth field can be defined in the provider class to link an OAuth class to the provider class 500. As will described, the OAuth class may define one or more attributes for a given authentication mechanism, such as SSL, HTTPS, and/or any other authentication mechanism.

A PLicenses field 514 may be defined in the provider class to link a PLicense class to the provider class 500. As will be described, the PLicense class may define various attributes for a particular type of license provided by any given cloud service provider. As also shown, a PSettings field 516 may be defined in the provider class 500 to link a PSettings class to the provider class 500. As will be described, the PSettings class may define attributes with respect to various provider specific settings for a given cloud service provider. As still shown, a PUSettings field 518 may be defined in the provider class to link a PUSettings class to the provider class 500. As will be described, the PSettings class may define attributes with respect to various user settings specified by a given cloud service provider.

B. PLicense Class

Figure 6:
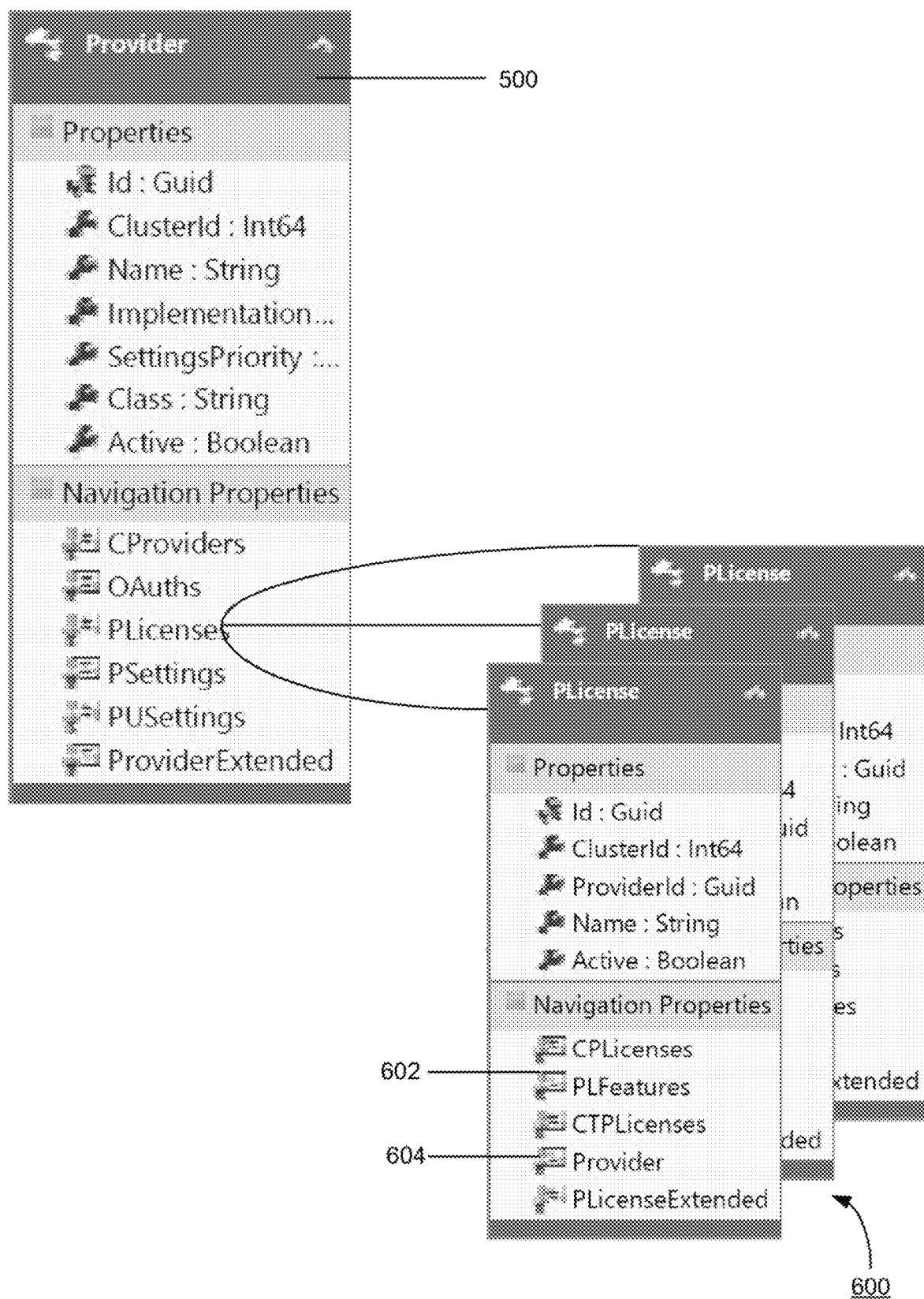
FIG. 6 illustrates an example a PLicense class that can be implemented for the provider data object.

FIG. 6 illustrates an example a PLicense class 600 that can be implemented for the provider data object. As described above, also shown in FIG. 6, the PLicense class 600 can be linked to the provider class 500. The PLicsense class 600 can be used to instantiate one or more licenses provided by any given cloud service provider. As shown, the PLicense class 600 can have an ID and a name field to identify a particular license, or a particular type of license that is provided by the given cloud service provider. For example, if the given cloud service provider provides 5 types of licenses, 5 instances of PLicense can be created and linked to the corresponding provider class that identifies the given cloud service provider. Such linking can be done through a navigation property field 604 defined in the PLicense class 600.

The PLicense class 600 may also define a number of other navigation properties, such as the PLFeatures 602, the CPLicense, CTPLicense, and/or any other navigation properties. The CPLicense field can be used to link a corresponding license stored in the database 102. As will be described, during a comparison stage in the synchronization process, the information captured by the PLicense 600 and information captured by the corresponding CPLicense can be compared to determine if the license information from the given cloud service provider is different from that stored in the database 102. The CTPLicense is similar to the CPLicense except it identifies a template that has license information corresponding to a particular PLicense.

C. PLFeature Class

Figure 7:
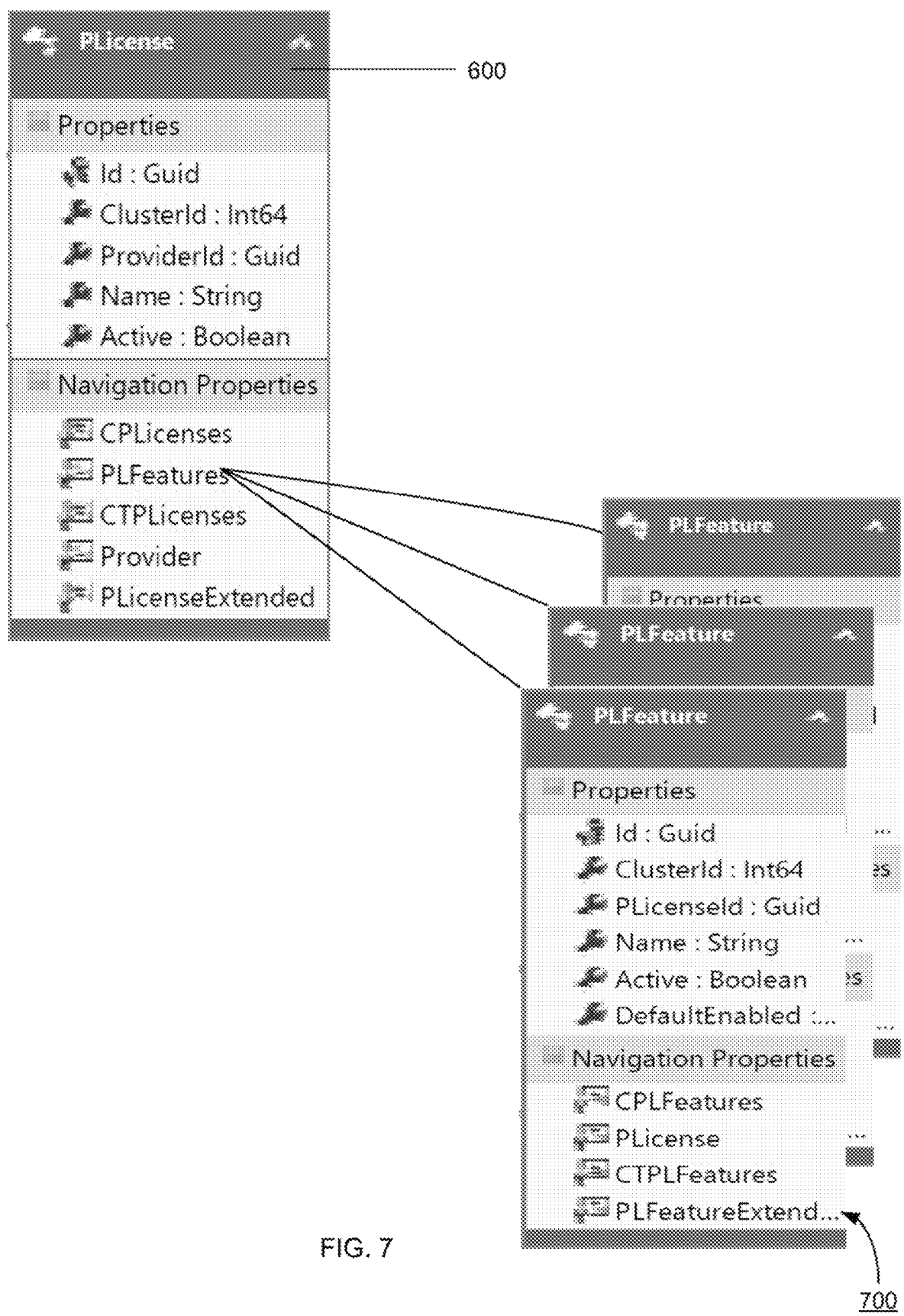
FIG. 7 illustrates an example a PLFeature class that can be implemented for the provider data object.

FIG. 7 illustrates an example a PLFeature class 700 that can be implemented for the provider data object. As described above, also shown in FIG. 7, the PLFeature class 700 can be linked to the PLicense class 600. The PLFeature class 700 can be used to instantiate one or more license features for a particular license identified by the PLicense class 600. As shown, the PLFeature class 700 can have an ID and a name field to identify a particular license feature, such as a level of access to the service under the license identified by the PLicense 600, a number of licenses available for PLicense 600 (i.e., when PLicense 600 identifies a particular type of licenses provided by the given cloud service provider), or any other license features.

For example, if the PLisense 600 has 3 license features, 3 instances of PLFeature can be created and linked to the corresponding PLicense class 600. As shown, such linking can be done through a PLicense field defined in the PLicense class 600. As also shown, the PLFeature class 700 may also define a number of other navigation properties, such as the CPLFeatures, CTPFeatures, and/or any other navigation properties. The CPLFeature field can be used to link a corresponding license feature stored in the database 102. As will be described, during a comparison stage in the synchronization process, the information captured by the PLFeature class 700 and information captured by the corresponding CPLFeature can be compared to determine if the license feature information from the given cloud service provider is different from that stored in the database 102. The CTPFeature is similar to the CPLFeature except it identifies a template that has license feature information corresponding to the particular PLFeature 700.

D. Other Exemplary Fields In The Provider Class

Figure 8:
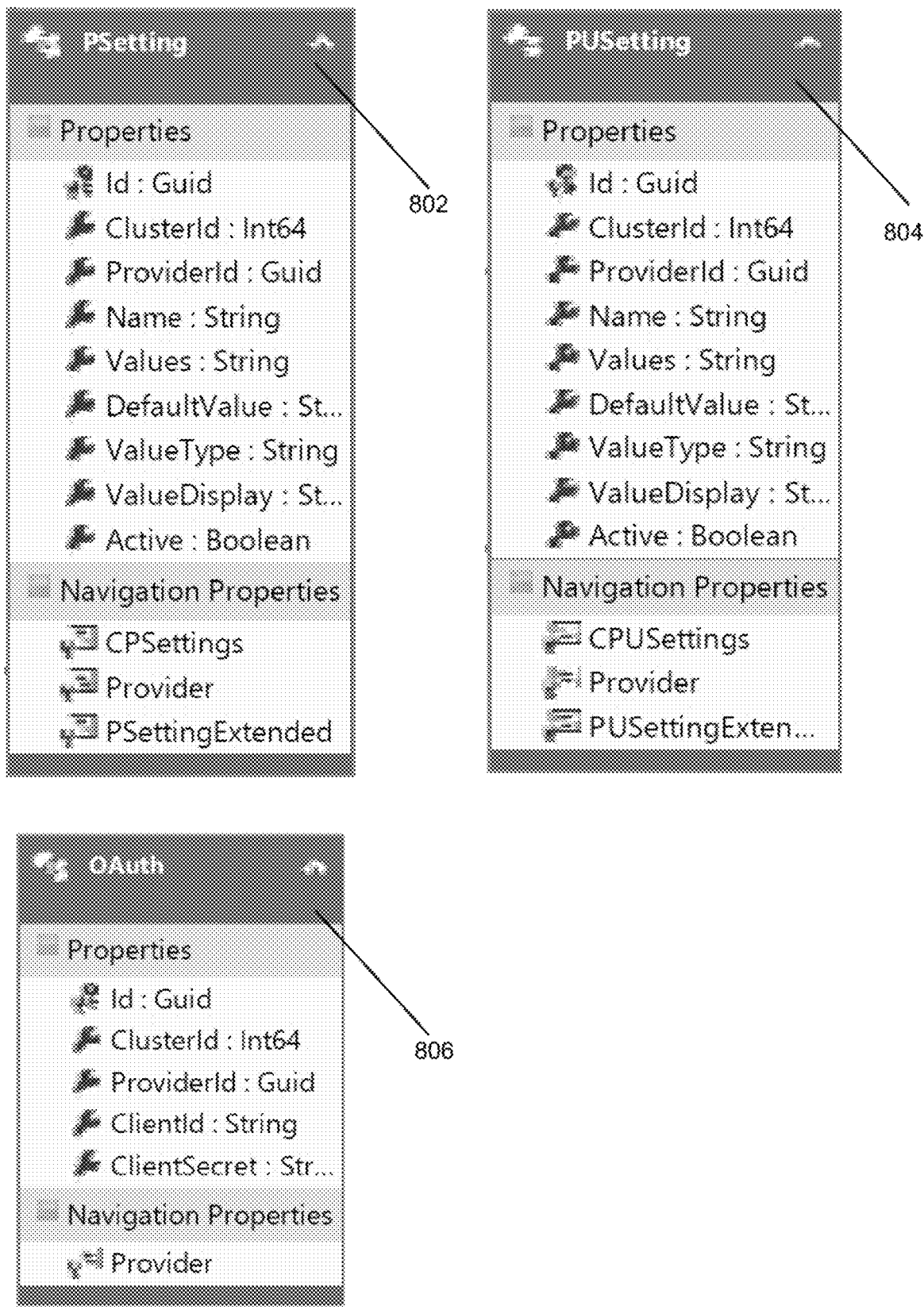
FIG. 8 illustrates some examples of implementations of the attributes for the provider class illustrated in FIG. 5.

FIG. 8 illustrates some examples of implementations of the attributes for the provider class illustrated in FIG. 5. For example, as shown, a PSetting class 802 can be implemented to identify a particular provider specific setting, for example an IP address of the provider, a domain name of the provider, a maximum number of connections supported by the provider for the entity, maximum available storage on the cloud service provide by the provider for the entity, and/or any other provider specific settings. The PUSetting class 804 can be implemented to identify a particular provider specified user setting, for example, a maximum available storage per user as supported by the provider, a maximum connection speed per user as supported by the provider, a level archive support provided by the provider for an individual user, and/or an any other provider specified user settings. The OAuth class 806 can be implemented to identify a particular authentication mechanism supported by the provider, such as SSL, HTTPS, and/or any other authentication mechanisms. Like the PLisense and PLFeature classes, each of these classes can also navigation properties, as shown, linking to corresponding classes. For brevity, these properties are not described in detail as they are self-explanatory from the examples shown in FIG. 8.

E. Exemplary Server Implementation

Figure 9:
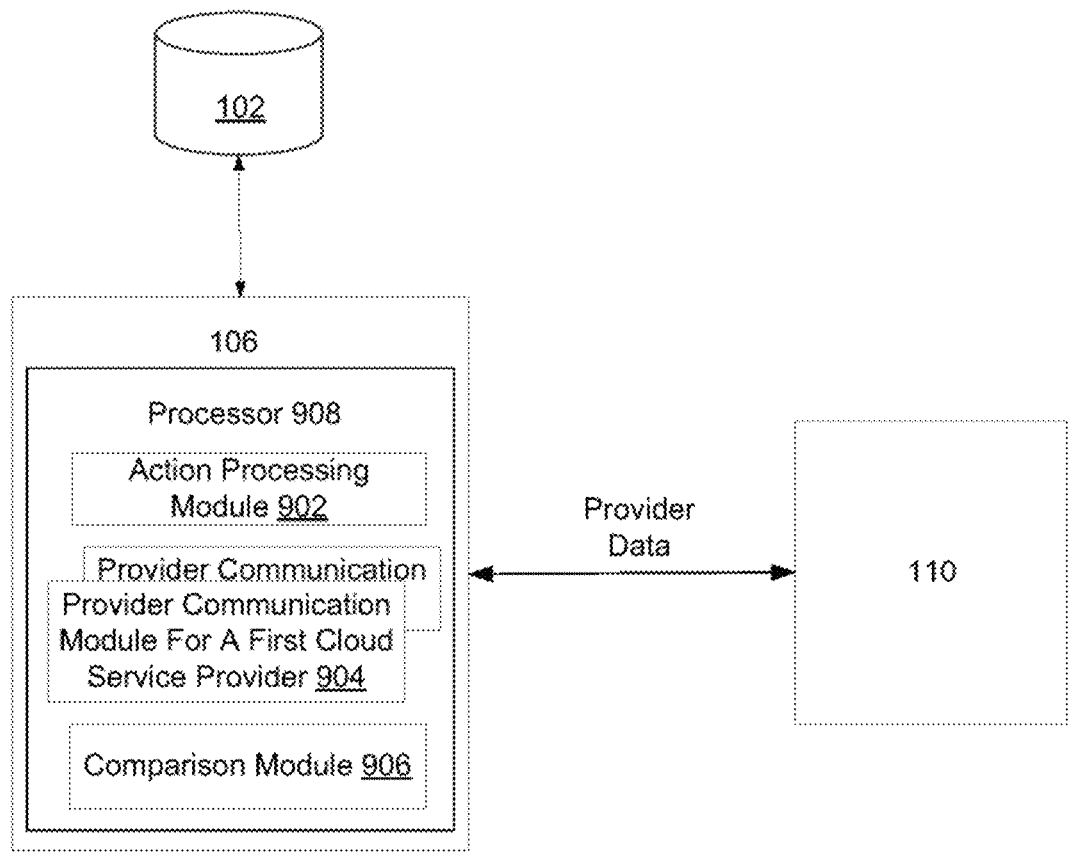
FIG. 9 is a system diagram showing an exemplary configuration of server for processing provider data according to the disclosure.

FIG. 9 is a system diagram showing an exemplary configuration of server 106 for processing provider data according to the disclosure. As shown, the server 106 can comprise a processor 908 configured to execute computer programs. The computer programs can include an action processing module 902, one or more provider communication module 904, a comparison module 906, and/or any other modules. The action processing module 902 can be configured to receive a request to synchronize data with one or more cloud service providers. For example, the action processing module 902 can receive the request from an administrator of the entity. As illustration, the request may indicate "synchronize provider data for Dropbox with data stored in the database". As After receiving the request, the action processing module 902 can be configured to schedule the request for execution. In some implementations, the action processing module 902 can be configured to determine an appropriate provider communication module 904 for executing the request.

The provider communication modules 904 can be configured to communicate with individual cloud service providers. A given provider communication module 904 may be configured with specific information regarding a particular cloud service provider. For example, the specific information may include a set of APIs provided by the particular cloud service provider, semantics regarding communicating and/or parsing data to and from the particular cloud service provider, one or more types of provide data available for synchronizing with the particular cloud service provider, one or more network addresses associated with the particular cloud service provider, and/or any other cloud service provider specific information. For example, as illustration, a provider communication module 904 for Dropbox may be configured such that data requests specific to Dropbox can be made with one or more cloud servers provided by Dropbox. For instance, the provider communication module 904 for Dropbox can be configured to make a request to get all licenses from Dropbox or update Dropbox license information so that the most current information regarding drop licenses purchased by the entity can be stored in the database 102. The provider communication module 904 for a particular cloud service provider can also be configured to process the provider data received from the particular cloud service provider using one or more instances of the provider data object to extract provider information as defined by the semantics in the provider data object.

The comparison module 906 can be configured to compare the extracted provider information with corresponding provider data in the database 102 and to determine if there is difference between the two. The comparison module 906 can be configured to save the provider data to the database 102 via the instance(s) of the provider data object if the comparison module 906 determines there is difference between the received provider data and the data stored in the database 102.

IV. Customer Provider Data Object

In certain embodiments, the synchronization process in accordance with the disclosure may employ a customer provider data object. As described above, the customer provider data object can have semantics similar to those in the provider data object. One or more instances of the customer provider data object can be created from database 102. The instance(s) of the customer provider data object can represent provider information that is stored in the database 102. As also described above, the instance(s) of the customer provider data object can be compared with corresponding instance(s) of the provider data object. For example, certain fields in the corresponding instance(s) of the provider data object may link the instance(s) of the customer provider data object. Through these links, corresponding provider information, i.e., that received from a given provider and that stored in the database 102, can be compared.

Figure 10:
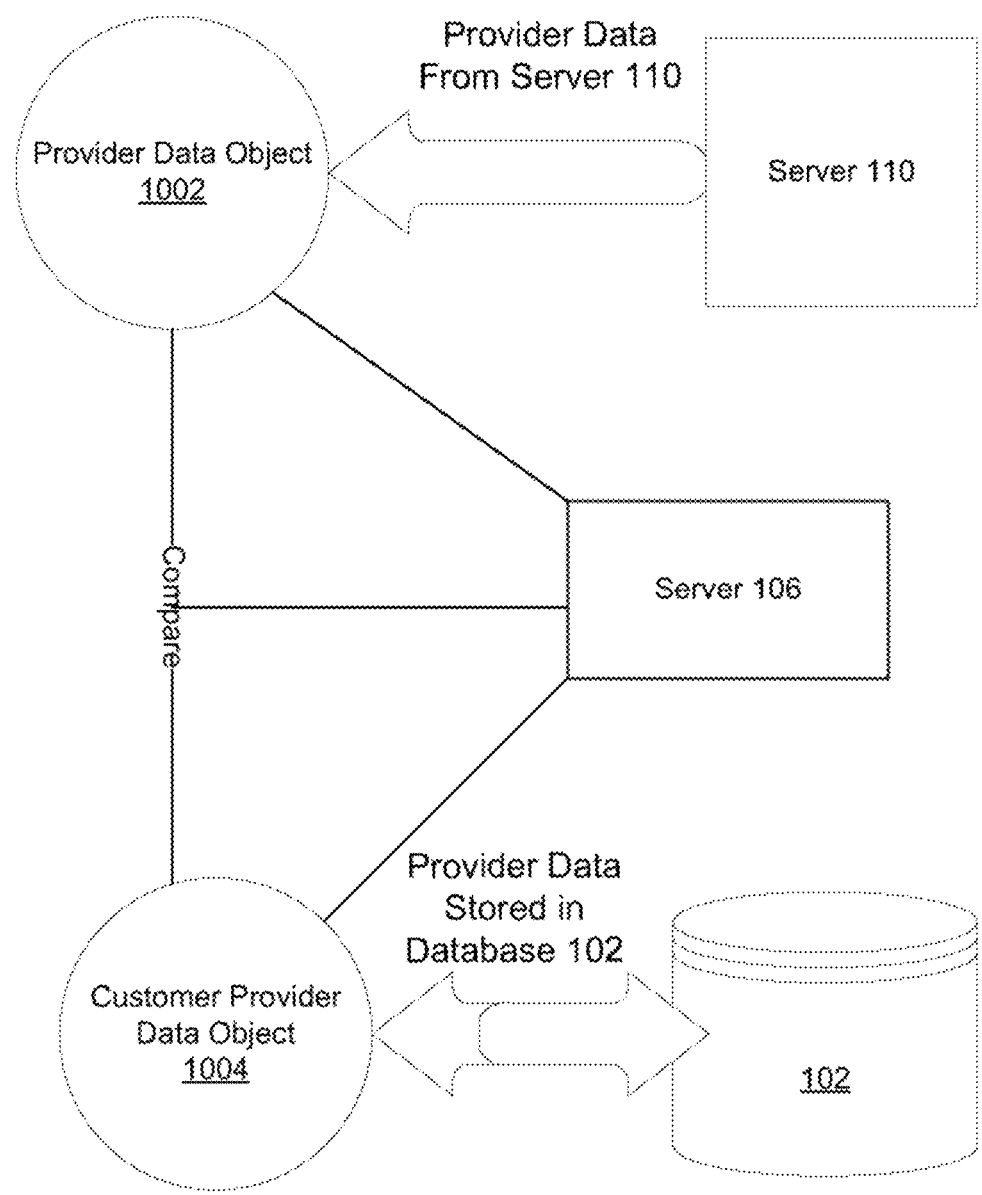
FIG. 10 illustrates one example of synchronizing process employing a customer provider data object in accordance with the disclosure.

FIG. 10 illustrates one example of synchronizing process employing a customer provider data object in accordance with the disclosure. As shown, in certain embodiments, server 106 can be configured to instantiate a customer provider data object 1004 for a given cloud service provider. Server 106 can be configured to process provider data stored in the database 102 for the given cloud service provider using the instance of the customer provider data object 1004 to obtain provider information stored in the database 102. This process may involve operations very similar to how server 106 processes the provider data received from server 110. As shown, after the instance of customer provider data object 1004 is created, the server 106 can be configured to compare it with the instance of the provider data object 1002 that has also been created by server 106 as described above. Since the instances of the two data objects have the same or substantially similar semantics, provider information processed by those instances can be compared.

Figure 11:
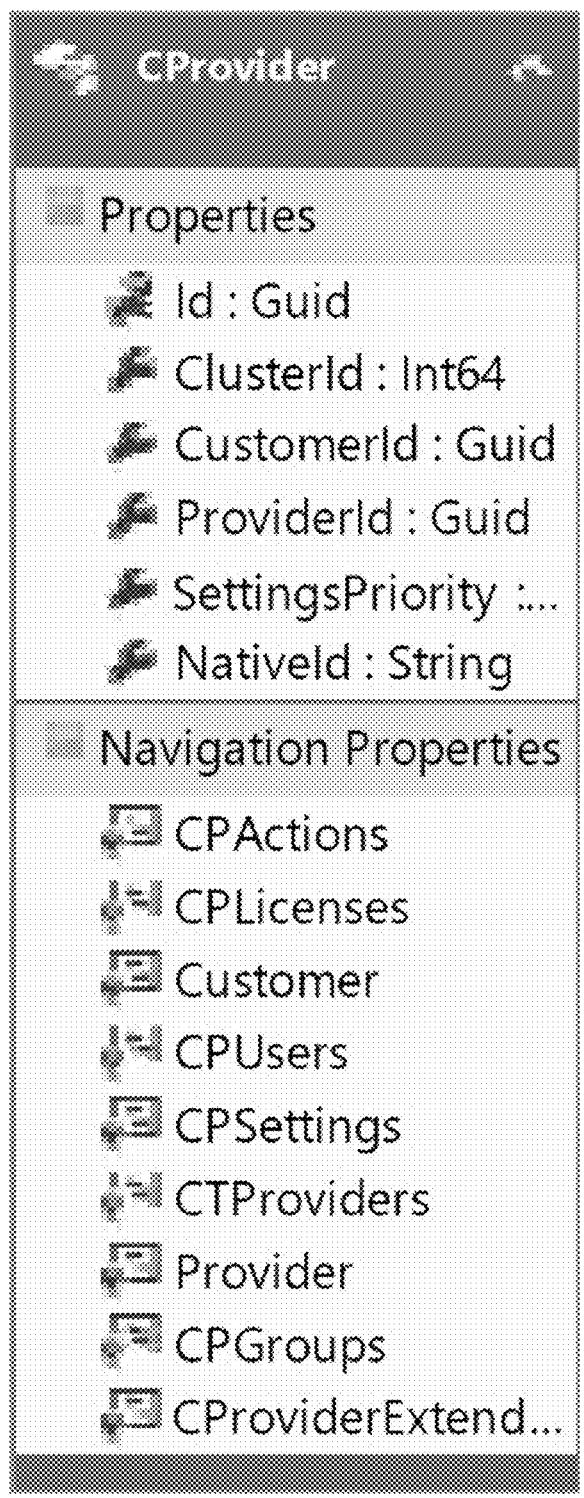
FIG. 11 illustrates a CProvider class that can be implemented for a customer provider data object.
Figure 12:
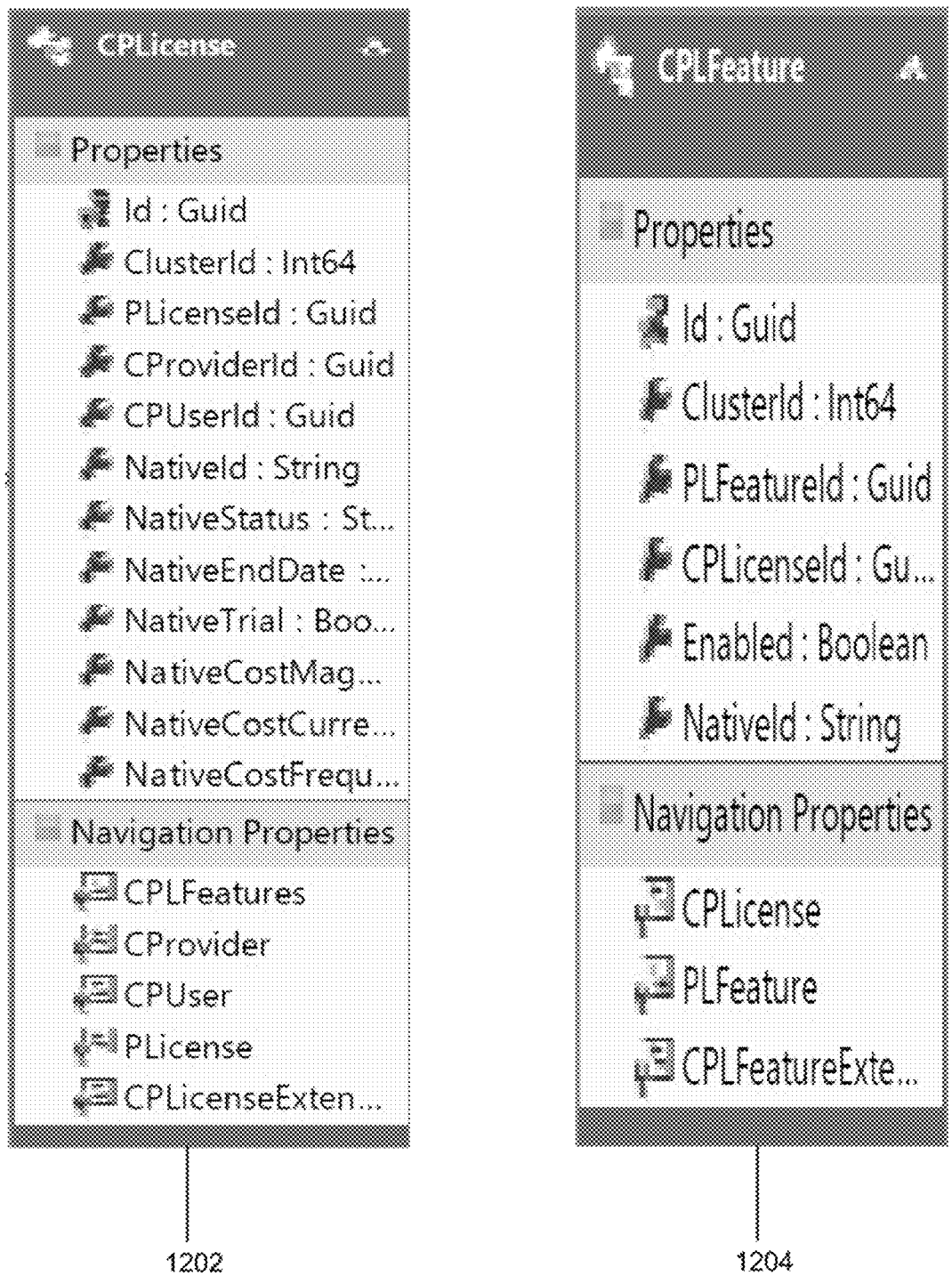
FIG. 12 illustrates a CPLicense class and a CPLFeature class that can be implemented for a customer provider data object.
Figure 13:
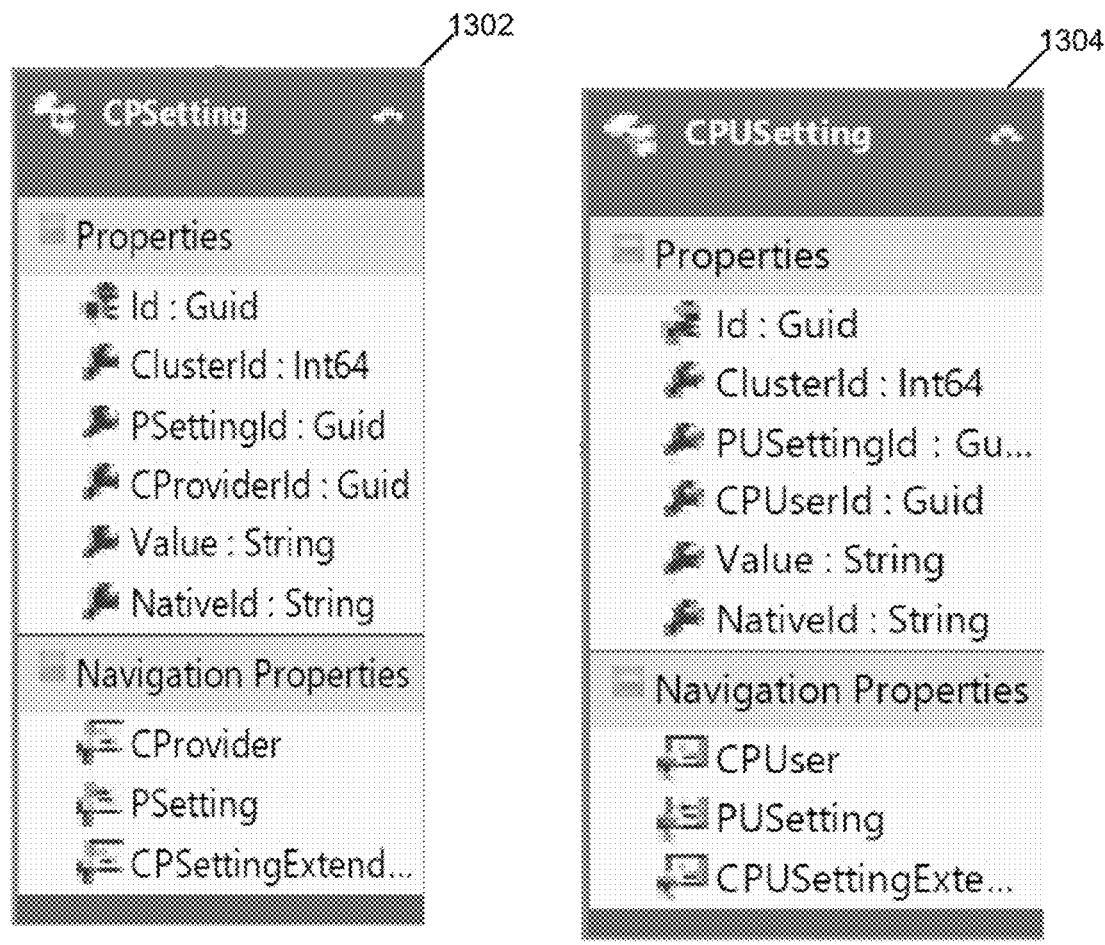
FIG. 13 illustrates a CPSettings class and a CPUSetting class that can be implemented for a customer provider data object.

FIGS. 11-13 illustrate various exemplary classes that can be implemented for the customer provider data object described above. In FIG. 11, a CProvider class 1100 is illustrated. As can be seen, the CProvider class has very similar properties and navigation properties to those described as being included in the provider class 500 shown in FIG. 5. The CProvider class can be used to process provider data stored in the database 102 for a particular cloud service provider. For example, the provider ID field in this class as shown can be used to identify the cloud service provider. FIG. 12 illustrates a CPLicense class 1202 and a CPLFeature class 1204. The CPLicense class 1202 can be linked to the CProvider class 1100 much like how the PLicense class 600 can be linked to the provider class 500 as illustrated in FIG. 6. The CPLFeature class 1204 can be linked to the CPLicense class 1202 much like how the PLFeature class 700 can be linked to the PLicense class 600 as illustrated in FIG. 7. These classes can be used to process license data stored in the database 102 for the particular cloud service provider. FIG. 13 illustrates CPSettings class 1302 corresponding to the PSetting class 802, and a CPUSetting class corresponding to the PUSetting class 804. These classes can be used to process provider specific settings data and provider specified user settings data stored in the database 102 for the particular cloud service provider.

V. A Process for Synchronizing Provider Data

Figure 14:
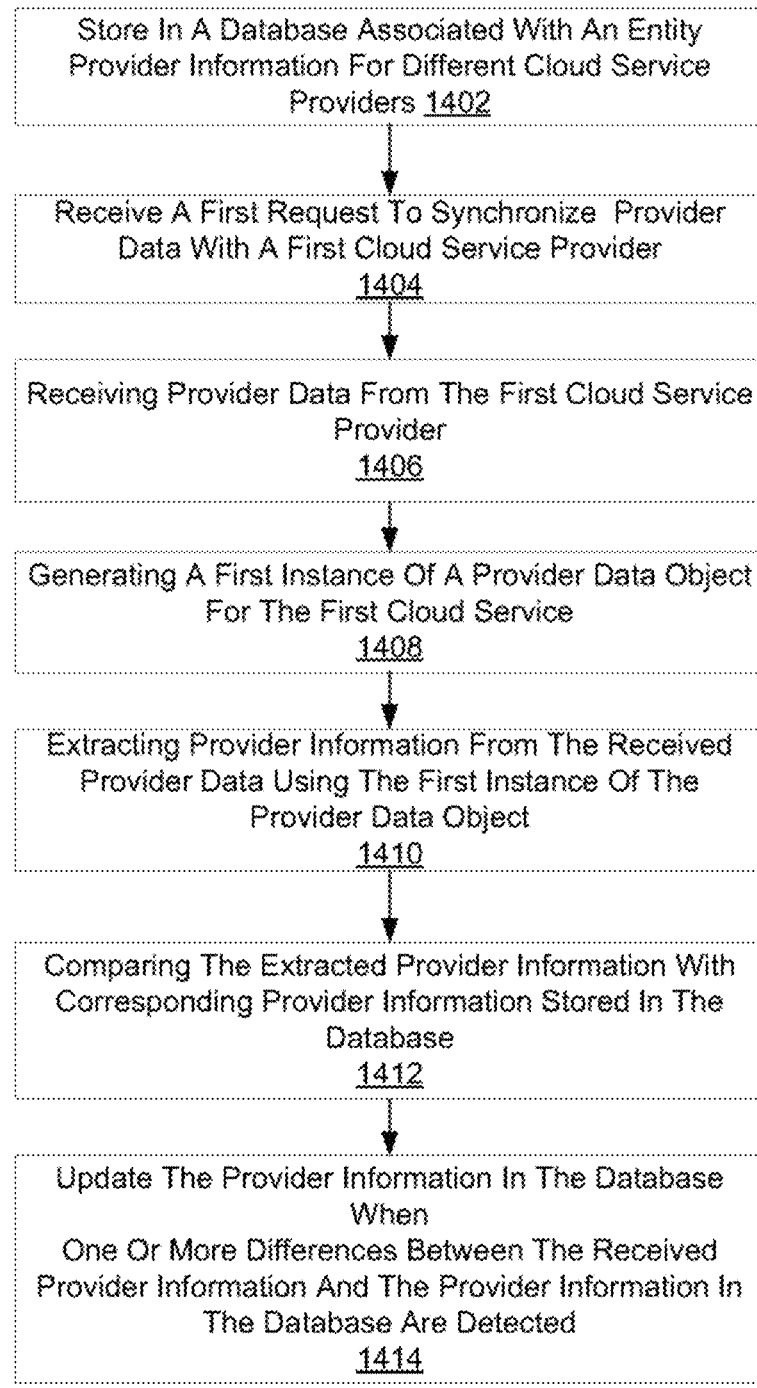
FIG. 14 is a flowchart of a method for synchronizing data with multiple cloud service providers for an entity in accordance with the disclosure.

FIG. 14 is a flowchart of a method 1400 for synchronizing data with multiple cloud service providers for an entity in accordance with the disclosure. The method presented in FIG. 14 and described below is intended to be illustrative and non-limiting. The particular series of processing steps depicted in FIG. 14 is not intended to be limiting. It is appreciated that the processing steps may be performed in an order different from that depicted in FIG. 14 and that not all the steps depicted in FIG. 14 need be performed.

In some embodiments, the method depicted in method 1400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1400 in response to instructions stored electronically on an electronic storage medium. The one or more processing devices may include one or more devices configured through hardware, firmware, and/or software to be specifically designed for execution of one or more of the operations of method 1400.

At 1402, provider information for a first cloud provider is stored in a database associated with an entity. As described above, the provider information may be initially obtained from the first cloud service provider a discovery process. The provider information may include license, provider specific settings, provider specified user settings, authentication mechanisms supported and/or any other provider information. As described above, in some implementations, the provider information for the first cloud service provider can be stored in one or more tables in the database. In those implementations, the provider data table(s) may be separate from the tables storing user records.

At 1404, a request for synchronizing provider data with a first cloud service provider can be received. For example, such a request may be initiated during a synchronization process with the first cloud service provider. In some implementations, operation 1404 may be performed by an action processing module the same as or substantially similar to the action processing module 902 described and illustrated herein.

At 1406, the provider data requested at 1404 may be received from the first cloud service provider. The provider data received at 1406 may be in a specific format such as XML, HTML, and/or any other format used by the first cloud service provider. In some implementations, operation 1404 may be performed by a provider communication module for the first cloud service provider the same as or substantially similar to the provider communication module 904 for the first cloud service provider described and illustrated herein.

At 1408, a first instance of a provider data object can be generated for the first cloud service provider. As described above, for synchronizing with any cloud service provider, the provider data object can be used to capture semantics of certain provider information of interest to the entity. The semantics may define particular provider information that is to be synchronized with the cloud service provider. Such a provider data object can then be instantiated for a given cloud service provider, such as the first cloud service provider, during data synchronization with that cloud service provider. In some implementations, the provider data object can be modeled using an object-oriented paradigm. For example, a class of provider data can be defined such that certain general provider attributes or fields are predefined through the provider class. In that example, the attributes in the provider class can then linked to corresponding classes, and so on. Examples of such classes are illustrated in FIGS. 5-9. In some implementations, operation 1408 may be performed by a provider communication module for the first cloud service provider the same as or substantially similar to the provider communication module 904 for the first cloud service provider described and illustrated herein.

At 1410, certain provider information can be extracted from the provider data received at 1406 using the instance of provider data object generated at 1408. The provider information extracted at 1410 can include groups, licenses, specific provider settings, user settings, and/or any other provider information. As described above, these pieces of provider information can be extracted from the provider data received at 1406 using the predefined semantics in the instance of the provider data object generated at 1408. In some implementations, operation 1408 may be performed by a provider communication module for the first cloud service provider the same as or substantially similar to the provider communication module 904 for the first cloud service provider described and illustrated herein.

At 1412, the provider information extracted at 1410 can be compared with corresponding provider information stored in the database. As described above, operation 1412 may involve matching the received provider information and the provider information already in the database. In certain embodiments, a customer provider data object described herein may be employed to process provider information already in the database. In those embodiments, since the customer provider data object has the same or substantially similar semantics to those in the provider data object, the comparison at 1412 can be made between the instance of the provider data object and an instance of the customer provider data object. FIGS. 11-13 provide some examples of the customer provider object. FIG. 10 illustrates an example of a comparison that can be performed at 1412, which however is not intended to be limited. In some embodiments, the received provider information may be compared with the provider information already in the database directly without using a customer provider data object. In some implementations, operation 1412 may be performed by a comparison module the same as or substantially similar to the comparison module 906 described and illustrated herein.

At 1414, the provider data information stored in the database can be updated when one or more differences between the received provider information and the provider information in the database are detected based on comparison performed at 1412. As described above, when such differences are detected, it can be determined that the received provider information has changed since the initial discovery process or since the last time the provider data was synchronized, and therefore the provider information in the database should be updated to include the latest provider information from the first cloud service provider. In some implementations, operation 1414 may be performed by a comparison module the same as or substantially similar to the comparison module 906 described and illustrated herein.

VI. Computer System

Any of the computer systems mentioned herein may utilize any suitable number of subsystems. Examples of such subsystems are shown in FIG. 15 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 15 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of synchronizing data from different cloud services, the method being implemented by a computer system with a database, the method comprising:
    storing, in storage associated with the computer system, a provider data object for processing provider data of a first cloud service provider; and
    synchronizing, at the computer system, the provider data with the first cloud service provider, wherein the synchronization comprises:
        generating a first instance of the provider data object for the first cloud service provider;
        obtaining first data by parsing the provider data using one or more semantic defined in the first instance of the provider data object;
        comparing the first data with first provider information stored in the database; and
        when the first data is determined to be different from the first provider information stored in the database, updating the provider information stored in the database.

2. The method of claim 1, further comprising:
    generating a first instance of a customer provider data object for the first cloud service provider; and
    obtaining first data stored in the database for the first cloud service provider using the first instance of the customer provider data object; and, wherein
    comparing the first data with the first provider information stored in the database comprises:
    comparing the first instance of the provider data object with the first instance of the customer provider data object.

3. The method of claim 1, wherein the first data includes information regarding multiple licenses provided by the first cloud service provider.

4. The method of claim 1, wherein the first data comprises one or more features for a first license provided by the first cloud service provider.

5. The method of claim 4, wherein the first data further indicates a quantity of the first license that is available for use.

6. The method of claim 1, wherein the provider data object further comprises at least one of: provider settings information regarding provider specific settings for the first cloud service provider, provider specified user settings information regarding user settings specified by a given cloud service provider, authentication information regarding one or more authentication mechanisms supported by the given cloud service provider.

7. The method of claim 1, wherein the provider data object further comprises information indicating an instance of a customer provider data object for the first cloud service provider correspond to the first instance of the provider data object.

8. The method of claim 7, wherein comparing the first instance of the provider data object with the first provider information stored in the database comprises: comparing the first instance of the provider data object with the instance of the customer provider data object corresponding to the first instance of the provider data object.

9. The method of claim 1, further comprising:
    generating a second instance of the provider data object for a second cloud service provider;
    obtain second data from the second cloud service provider using the first instance of the provider data object;
    comparing the second data with second provider information stored in the database, wherein the comparing comprises determining whether the second data is different from the second provider information stored in the database; and
    if the second data is determined to be different from the second provider information stored in the database, updating the second provider information stored in the database.

10. A system for synchronizing data from different cloud services, the system comprising a database and a processor configured by machine-readable instructions to perform:

storing, in storage associated with the system, a provider data object for processing provider data of a first cloud service provider; and synchronizing, at the computer system, the provider data with the first cloud service provider, wherein the synchronization comprises:

generating a first instance of the provider data object for the first cloud service provider;

obtaining first data by parsing the provider data using one or more semantic defined in the first instance of the provider data object;

comparing the first data with first provider information stored in the database; and when the data is determined to be different from first license information stored in the database, updating the first provider information stored in the database.

11. The system of claim 10, wherein the processor is further configured to perform:

generating a first instance of a customer provider data object for the first cloud service provider; and obtaining first data stored in the database for the first cloud service provider using the first instance of the customer provider data object; and, wherein comparing the first data with the first provider information stored in the database comprises:

comparing the first instance of the provider data object with the first instance of the customer provider data object.

12. The system of claim 10, wherein the first data includes information regarding multiple licenses provided by the first cloud service provider.

13. The system of claim 10, wherein the first data comprises one or more features for a first license provided by the first cloud service provider.

14. The system of claim 10, wherein the first data further indicates a quantity of a first license that is available for use.

15. The system of claim 10, wherein the provider data object further comprises at least one of: provider settings information regarding provider specific settings for the first cloud service provider, provider specified user settings information regarding user settings specified by a given cloud service provider, authentication information regarding one or more authentication mechanisms supported by the given cloud service provider.

16. The system of claim 10, wherein the provider data object further comprises information indicating an instance of a customer provider data object for the first cloud service provider correspond to the first instance of the provider data object.

17. The system of claim 16, wherein comparing the first instance of the provider data object with the first provider information stored in the database comprises: comparing the first instance of the provider data object with the instance of the customer provider data object corresponding to the first instance of the provider data object.

18. The system of claim 10, wherein the processor is further configured to perform:

generating a second instance of the provider data object for a second cloud service provider;

obtain second data from the second cloud service provider using the first instance of the provider data object;

comparing the second data with second provider information stored in the database, wherein the comparing comprises determining whether the second data is different from the second provider information stored in the database; and if the second data is determined to be different from the second provider information stored in the database, updating the second provider information stored in the database.

19. A non-transitory computer program product comprising a non-transitory tangible medium including computer system executable code for a computer system including a processor, a memory and a display, the computer program product comprising code that directs the processor to perform:

storing, in storage associated with the computer system, a provider data object for processing provider data of a first cloud service provider; and synchronizing, at the computer system, the provider data with the first cloud service provider, wherein the synchronization comprises:

generating a first instance of the provider data object for the first cloud service provider;

obtaining first data by parsing the provider data using one or more semantic defined in the first instance of the provider data object;

comparing the first data with first provider information stored in a database; and when the first data is determined to be different from the first provider information stored in the database, updating the provider information stored in the database.

20. The non-transitory computer product of claim 19, wherein the code further directs the processor to perform:

generating a first instance of a customer provider data object for the first cloud service provider; and obtaining first data stored in the database for the first cloud service provider using the first instance of the customer provider data object; and, wherein comparing the first data with the first provider information stored in the database comprises:

comparing the first instance of the provider data object with the first instance of the customer provider data object.

* * * * *